US009492833B2

(12) United States Patent
Sim

(10) Patent No.: US 9,492,833 B2
(45) Date of Patent: Nov. 15, 2016

(54) METHOD FOR AUTOMATICALLY CONTROLLING A PAINTING PROCESS

(71) Applicant: Yurim Infosys Co., Ltd., Chungcheongnam-do (KR)

(72) Inventor: Hyun Bo Sim, Gyeonggi-do (KR)

(73) Assignee: Yurim Infosys Co., Ltd., Chungcheongnam-do (KR)

( * ) Notice: Subject to any disclaimer, the term of this patent is extended or adjusted under 35 U.S.C. 154(b) by 0 days.

(21) Appl. No.: 14/354,506

(22) PCT Filed: Oct. 29, 2012

(86) PCT No.: PCT/KR2012/008943
§ 371 (c)(1),
(2) Date: Apr. 25, 2014

(87) PCT Pub. No.: WO2013/062390
PCT Pub. Date: May 2, 2013

(65) Prior Publication Data
US 2015/0174600 A1 Jun. 25, 2015

(30) Foreign Application Priority Data
Oct. 28, 2011 (KR) ........................ 10-2011-0111387

(51) Int. Cl.
*G06F 17/00* (2006.01)
*B05B 12/08* (2006.01)

(52) U.S. Cl.
CPC ............. *B05B 12/08* (2013.01); *B05B 12/084* (2013.01)

(58) Field of Classification Search
CPC ...... B05B 12/08; B05B 12/00; B05B 12/084
USPC .................................................. 235/375, 376
See application file for complete search history.

(56) References Cited

U.S. PATENT DOCUMENTS

| | | | | |
|---|---|---|---|---|
| 4,611,380 | A * | 9/1986 | Abe et al. | 29/430 |
| 4,764,667 | A * | 8/1988 | Abe et al. | 235/487 |
| 6,032,861 | A * | 3/2000 | Lemelson et al. | 235/456 |
| 6,484,121 | B1 * | 11/2002 | Filev | B05B 12/12 118/668 |
| 6,543,691 | B1 * | 4/2003 | Lemelson et al. | 235/456 |
| 7,220,966 | B2 * | 5/2007 | Saito et al. | 250/341.6 |
| 8,204,294 | B2 * | 6/2012 | Alloo et al. | 382/141 |
| 9,061,309 | B2 * | 6/2015 | Haas et al. | |
| 2003/0221615 | A1 * | 12/2003 | Lastowka | B05B 15/08 118/679 |
| 2005/0186327 | A1 * | 8/2005 | Saito et al. | 427/8 |
| 2006/0177566 | A1 * | 8/2006 | Price | 427/8 |
| 2011/0094444 | A1 * | 4/2011 | Haas et al. | 118/665 |

FOREIGN PATENT DOCUMENTS

| | | |
|---|---|---|
| KR | 1020040058146 | 7/2004 |
| KR | 100768404 | 10/2007 |
| KR | 100779152 | 11/2007 |
| KR | 100857978 | 9/2008 |

* cited by examiner

*Primary Examiner* — Paultep Savusdiphol
(74) *Attorney, Agent, or Firm* — IP & T Group LLP

(57) ABSTRACT

A method of automatically controlling a painting process in which an optimum production condition can be set by analyzing data on a production condition of a painting product, in particular, by which when a large number of inferior products are generated due to LOT, a tracing operation for identifying a cause of error in a production procedure can be performed.

7 Claims, 8 Drawing Sheets

FIG. 4-3

| Line name | Water rinsing #2 | | Water rinsing #1 | | Main greasing #2 | | Main greasing #1 | | Preliminary greasing | | Hot water greasing | |
|---|---|---|---|---|---|---|---|---|---|---|---|---|
| Condition name | Pressure | | Pressure | | Temperature | Pressure | Temperature | Pressure | Temperature | Pressure | Temperature | Pressure |
| Management reference | 1.0~1 | | 0.2~0 | | 45 ~ | 1.0~1 | 45 ~ | 0.2~0 | 45 ~ | 0.2~0 | 55 ~ | 1.0~1 |
| Current condition | 0.495 | | -0.24 | | 49.5 | 0.401 | 44.06 | -0.03 | 46 | -0.01 | 59.5 | 0.538 |
| Total/sub | | | | | | | | | | | | |

Water rinsing #2 | Water rinsing #1 | Main greasing #2 | Main greasing #1 | Preliminary greasing | Hot water greasing

FIG. 4-5

Temperature: ℃ Conductivity: ㎲/㎠ Pressure: kgf/㎠

| Line name | Condition name | Management reference | Current condition | Total/sub |
|---|---|---|---|---|
| Electro-static painting | Tempe-rature | 28 ~ 33 | 31.125 | ● |
| | Pre-ssure | 0.3 ↓ | | |
| Polar liquid apparatus | PH | 1.5 ~ 3.2 | 2.2407 | ● |
| | Conduct-ivity | 2500~55 | 2709.38 | ● |
| UF apparatus | PH | 5.5 ~ 6.2 | 5.3972 | ↓ |
| | Conduct-ivity | 800 ~ 12 | 866.25 | ● |
| | Pre-ssure | | | ● |
| UF #1 | Pre-ssure | 0.2~0.3 | 0.4552 | ↑ |
| UF #2 | Pre-ssure | 1.0~1.5 | 1.4726 | ● |
| UF #3 | Pre-ssure | 0.2~0.3 | 0.7905 | ↑ |
| Pure water rinsing #2 | PH | 5.9 ~ 8.0 | 6.7778 | ● |
| | Conduct-ivity | 50만Ωcm | | ● |
| | Pre-ssure | 1.0~1.5 | 0.78 | ↓ |
| Drying furnace | Tempe-rature | 200℃± | | |
| Gas burner | Tempe-rature | | | ↓ |
| Circulation fan | Tempe-rature | 200℃± | 204.313 | ● |
| Film forming hot water | Tempe-rature | 40 ~ 100 | 56.8125 | ● |

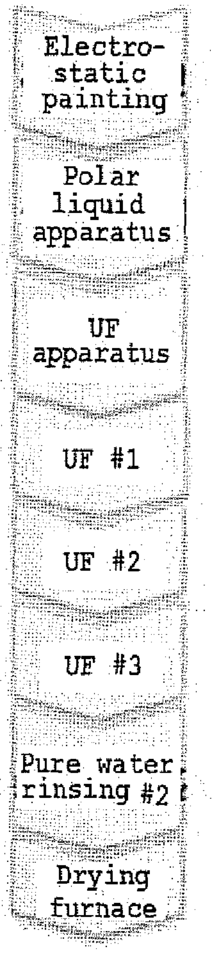

METHOD FOR AUTOMATICALLY CONTROLLING A PAINTING PROCESS

This application is a national stage application of PCT/KR2012/008943 filed on Oct. 29, 2012, which claims priority of Korean patent application number 10-2011-0111387 filed on Oct. 28, 2011. The disclosure of each of the foregoing applications is incorporated herein by reference in its entirety.

TECHNICAL FIELD

The present invention relates to a method for automatically controlling a painting process, and more particularly to a method of automatically controlling a painting process in which an optimum production condition can be set by analyzing data on a production condition of a painting product, in particular, by which when a large number of inferior products are generated due to LOT, a tracing operation for identifying a cause of a production procedure can be performed.

BACKGROUND ART

In general, a painting process is sequentially performed in a degreasing container or an electrolytic degreasing container, a first hot water rinsing container, a surface adjusting container, a chemical film forming container, a second hot water rinsing container, a water rinsing container, and a pure water rinsing container.

In the painting process according to the related art, production conditions such as types of hangers for products, an amount of held products per hanger, an electrostatic voltage, an electrostatic current, an electrostatic current flow time, a temperature of an electrostatic container, a paint, an expediting agent, an amount of degreasing agent, an electrolytic degreasing voltage, and a temperature of a drying furnace should be managed.

However, in the painting process according to the related art, states of the processes are measured with an analog gauge, in which case since an operator identifies states of processes at a time interval or determines states of processes by sight to adjust production conditions of the processes, a production condition of the painting process cannot be systematically managed and controlled.

Thus, the painting process according to the related art generates a large number of inferior products due to LOT, and when inferior products are generated, a tracing operation for identifying a cause of a production operation is impossible.

Further, since it is impossible to precisely control a production condition, an excessive amount of raw materials are consumed, and since equipment should be operated in advance due to the characteristics of the process, man power and processing time are excessively consumed.

Further, since information of an operator due to production of a product cannot be systematically managed, a result of the operator cannot be precisely managed, it is difficult to carry out an improvement education of an unskilled operator, and it is difficult to trace a cause of a human factor due to an error.

In addition, hangers should be periodically sorted according to the number of productions to perform a separating operation, but since it is impossible to manage individual histories of hangers, an error rate of the products increases.

The background of the present invention may include a system for providing painting information and a method of controlling the same which are disclosed in Korean Patent Application Publication No. 10-2003-0016506, and the present invention provides a method of automatically controlling a painting process by which an optimum production condition can be set by analyzing data on an actual thickness of a paint film regarding a production condition of a painting product.

DETAILED DESCRIPTION OF THE INVENTION

Technical Problem

The present invention has been made in an effort to solve the above-mentioned problems, and it is an object of the present invention to evaluate a quality of an actually produced painting product, set information on an optimum production condition, and apply the information to a painting operation.

Another object of the present invention is to further perform a pretreating operation, and input information on a product, hangers, and an operator before the painting operation.

Another object of the present invention is to scan a product held on a hanger.

Another object of the present invention is to calculate production condition information by using scan information of a product.

Another object of the present invention is to control a painting apparatus according to a production condition of a painting operation.

Another object of the present invention is to provide a painting method by which, when a number of inferior products are generated due to LOT, a tracing operation for identifying a cause of error in the production work can be performed.

Technical Solution

In accordance with an aspect of the present invention, there is provided a method of automatically controlling a painting process, the method including: performing an operation of painting a product by using a painting unit; measuring a thickness of a paint film of the produced product by using a paint film measuring unit; comparing a thickness of a paint film of the produced product with a production quality condition by using a painting condition calculating unit, and updating a production condition; and storing the production condition information calculated by the painting condition calculating unit by using a production information storing unit.

The method further includes, before performing an operation of the product, performing a preprocessing operation of the paining process.

The method further includes inputting information of an operator, product information, and hanger information by using a work input unit; scanning barcodes of a product held on a hanger and the hanger by using a scan unit.

The method further includes, after scanning the product loaded on the hanger, comparing the scanned information with production condition information set formerly by using the painting condition calculating unit.

The method further includes, after calculating the production condition, controlling at least one of an amount of introduced raw material, a supply of pure water, an electrolytic degreasing voltage, an electrostatic flow voltage, an electrostatic current flow time, an electrostatic flow current, a drying temperature, and a temperature of an electrostatic container by using a painting unit control unit.

The inputting of the information of the operator and product information includes: identifying a type of hanger on which a product is held and an amount of held products per hanger by using a work input unit; and recognizing and inputting unique identification information of the operator.

In the controlling of at least one of an amount of introduced raw material, a supply of pure water, an electrolytic degreasing voltage, an electrostatic flow voltage, an electrostatic current flow time, an electrostatic flow current, a drying temperature, and a temperature of an electrostatic container, at least one of a degreasing agent, a surface adjusting agent, a film former, an expediting agent, and a neutralizer is supplemented by using a metering pump, and a temperature of an electrostatic container or a temperature of a drying furnace is controlled by using a Programmable Logic Controller (PLC).

In the controlling of at least one of an amount of introduced raw material, a supply of pure water, an electrolytic degreasing voltage, an electrostatic flow voltage, an electrostatic current flow time, an electrostatic flow current, a drying temperature, and a temperature of an electrostatic container, any one of an electrolytic degreasing voltage, an electrostatic flow voltage, an electrostatic current flow time, and a flow current is controlled by using a rectifier connected to an electrode rod, an electrode plate, or a conductor of the electrostatic container.

In the controlling of at least one of an amount of introduced raw material, a supply of pure water, an electrolytic degreasing voltage, an electrostatic flow voltage, an electrostatic current flow time, an electrostatic flow current, a drying temperature, and a temperature of an electrostatic container, and a rectifier or a temperature control unit is driven according to a time set to a timer included in the painting unit control unit.

Advantageous Effects

As described above, when the method of automatically controlling a painting process according to the present invention is applied, an optimum production condition can be applied when the same kind of products are additionally produced by evaluating a quality of the actually produced painting product and setting production condition information. Further, an amount of used raw material can be reduced and productivity can be improved.

Further, a result of an operator can be efficiently managed by inputting information of a product and an operator before a painting operation by further performing a pretreatment operation, so that a result of the operator can be efficiently managed and an inferior product can be traced later.

Further, a production condition can be accurately calculated according to an actual area of a product and the characteristics of the product by scanning the product held on a hanger.

Further, a painting apparatus can be precisely controlled according to a production condition of a painting operation.

As a result, when a number of inferior products are generated due to LOT, a tracing operation for identifying a cause of the production work can be performed.

MODE FOR CARRYING OUT THE INVENTION

Hereinafter, details for carrying out a method of automatically controlling a painting process according to the present invention will be described.

Figure 1:
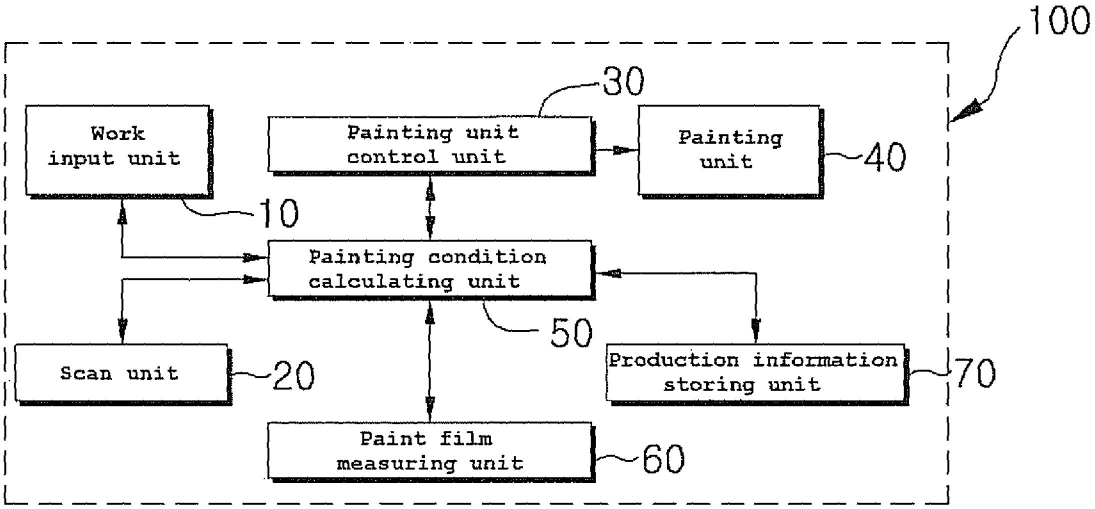
FIG. 1 is a system diagram for carrying out a method of automatically controlling a painting process according to the present invention.

FIG. 1 is a system diagram for carrying out a method of automatically controlling a painting process according to the present invention, and an automatic control system 100 includes a work input unit 10, a scan unit 20, a painting unit control unit 30, a painting unit 40, a painting condition calculating unit 50, a paint film measuring unit 60, and a production information storing unit 70.

Figure 2:
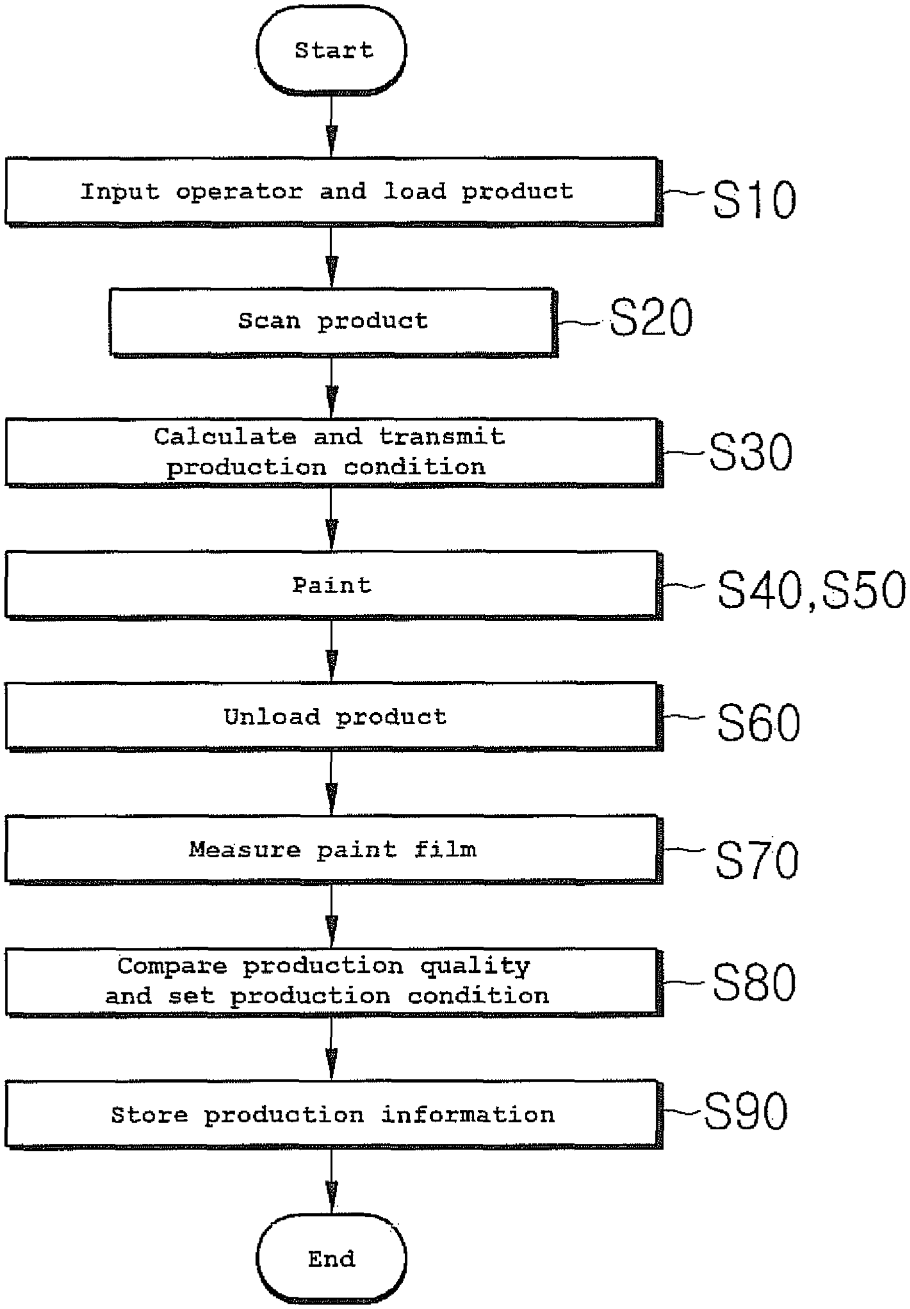
FIG. 2 is a flowchart of the method of automatically controlling a painting process according to the present invention.

FIG. 2 is a flowchart showing an entire flow of a method of automatically controlling a painting process by using the automatic control system 100 according to the present invention, and first, a step of inputting information of an operator and production information is performed by using the work input unit 10 (S10).

It is preferable that step S10 according to the present invention includes a step of identifying product information, a type of a hanger on which a production is held, and the number of held products for each hanger and a step of recognizing and inputting unique identification information of an operator.

That is, it should be identified through step S10 whether a hanger for holding a product is proper and the number of products to be held, and although the work input unit 10 is realized by a PDA terminal which is easy to be carried by the operator, the present invention is not limited thereto and the work input unit 10 may be realized by an information input unit such as a smartphone, a hand terminal, or a CCD camera.

Further, according to the present invention, it is preferable that a hanger for holding a product and a loading container of a stocked product include identification members for identifying hangers or products, and it is also preferable that the identification members are realized by high temperature barcodes or RFID tags.

That is, hanger history information may be managed by recognizing identification information of hangers realized by high temperature barcodes or RFID tags, and the hanger history information may be used as data important for production of painting products.

Information of an operation is input in step S10 according to the present invention because a result of the operator may be automatically managed and the operator may be traced when an inferior product is produced later.

The production information and operator information input in step S10 is forwarded to the painting condition calculating unit 50.

Next, a step of scanning a barcode of a product located on a hanger or a hanger is performed by using the scan unit 20 (S20).

In the embodiment of the present invention, in step S20, a Charge Coupled Device (CCD) camera is installed in a specific section to scan an image of a product and a barcode of a hanger and the image of the scanned product and the barcode of the hanger are forwarded to the painting condition calculating unit 50.

Through step S20 according to the present invention, a recognition rate of barcode information can be improved and raw materials, such as paint, an expediting agent, and a degreasing agent, which are consumed for processes can be properly compensated for according to a production area of a product.

Through steps S10 and S20 according to the present invention, barcode information formed in a product container, barcode information of a hanger, and information of an operator can be collectively managed and production information can be systematically managed.

Next, a step of comparing the information with production condition information set in advance and calculating a production condition by using the painting condition calculating unit 50 is performed (S30).

Step S30 according to the present invention refers to a step of deducing a production condition through input production information and image scan information by using production condition information stored in the production information storing unit 70, and the deduced production information condition is forwarded to the painting unit control unit 30.

Next, a step of performing a painting operation of a product by using the painting unit 40 is performed (S40 and S50).

Figure 3:
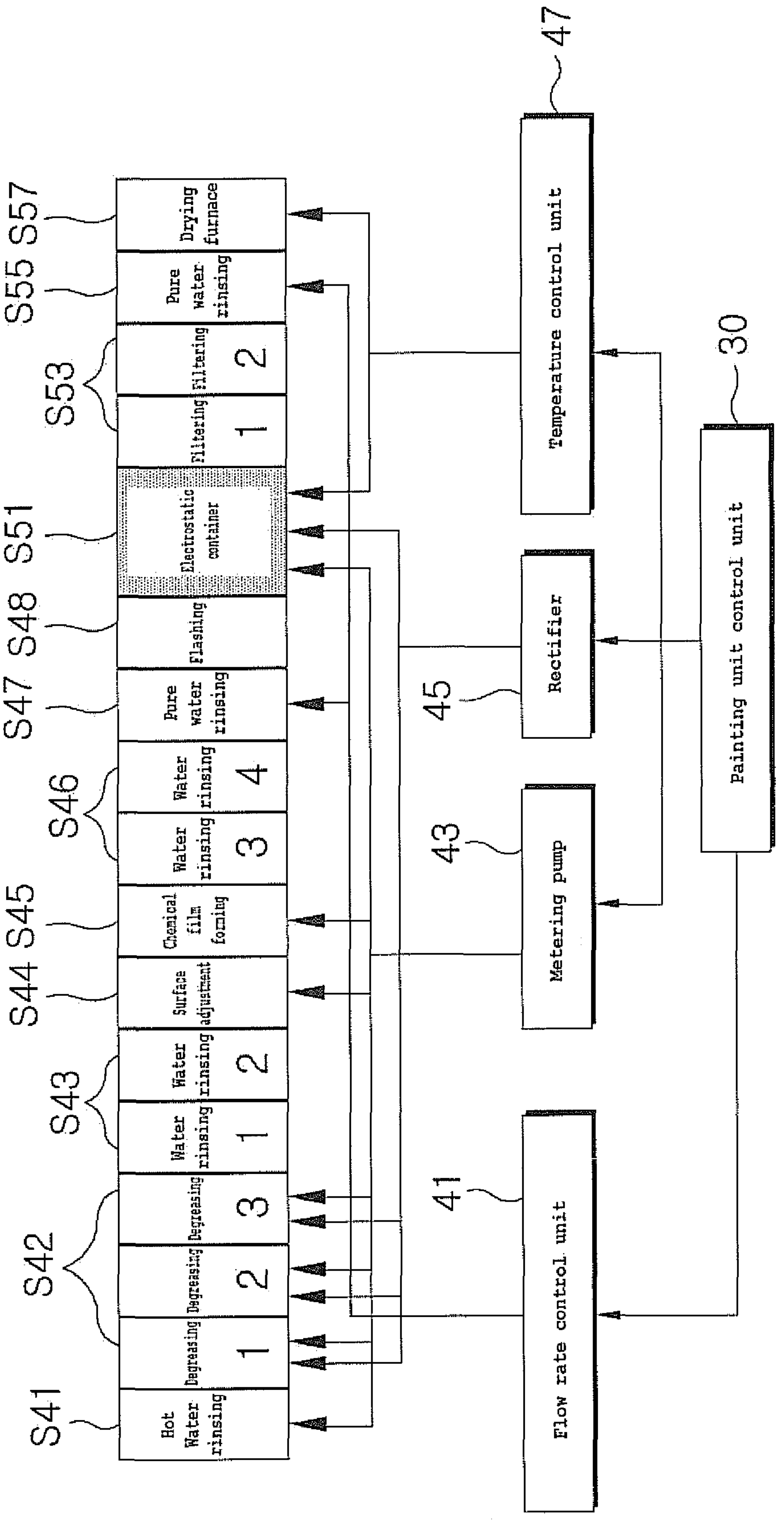
FIG. 3 is a concept view showing detailed flows of steps S40 and S50 of the method of automatically controlling a painting process according to the present invention.

As shown in FIG. 3, in steps S40 and S50, the painting unit control unit 30 provides a flow rate control unit 41, a metering pump 43, a rectifier 45, and a temperature control unit 47 of the painting unit 40 with a signal for controlling at least one of an amount of introduced raw material, a voltage of an electrolytic degreasing container, an electrostatic flow voltage, an electrostatic flow current, an electrostatic current flow time, a drying temperature, and an electrostatic container temperature.

In detail, pure water supplied to a pure water storage container is controlled by using the flow rate control unit 41, and the flow rate control unit 41 controls a valve of the pure water storage tank by recognizing a conductivity of pure water and a value of PH meter of pure water to supply pure water and stop the supply of pure water according to a level gauge of the pure water.

At least one of a degreasing agent, a surface adjusting agent, a film former, an expediting agent, and a neutralizer is supplemented by using the metering pump 43, and a voltage of an electrolytic degreasing container, a voltage, a current, and a current flow time of an electrostatic container are controlled by using the rectifier 45 connected to an electrode rod of the electrostatic container.

That is, the painting unit control unit 30 according to the present invention may calculate an optimum voltage value according to an area of a product and supply the calculated voltage to the electrolytic degreasing container through the rectifier 45.

This can ensure degreasing even though a constant voltage is supplied without considering an area of the product according to the related art and prevent a product from being damaged due to an overvoltage.

Further, a temperature of the electrostatic container or a temperature of a drying furnace is controlled by using the temperature control unit 47.

It is preferable that the painting unit control unit 30 according to the present invention further includes a timer, and it is preferable that the timer according to the present invention has a communication function so that driving times of the rectifier 45 and the temperature control unit 47 can be controlled according to a control signal forwarded to the timer.

It is preferable that steps S40 and S50 according to the present invention further include a step of generating a production date record as the product is painted.

The painting unit 40 performs a painting operation according to a control signal, and the painting operation is performed in the following sequence in the embodiment of the present invention.

A hot water rinsing operation S41, first to third degreasing operations S42, and first and second water rinsing operations S43 are performed by supplementing a degreasing agent, a surface adjusting operation S44 is performed by supplementing a surface adjusting agent, and a chemical conversion coating operation S45 is performed by supplementing a film former, an expediting agent, and a neutralizer.

Further, the third and fourth water rinsing operations (S46) are performed, a flashing operation S48 is performed, a paint, a glacial acetic acid, and an additive are supplemented, voltage and current are controlled, an electrostatic operation S51 is performed by controlling a current flow time and a temperature of the electrostatic container, first and second liquid filtering operations S53 are performed, a pure water rinsing operation S55 is performed, and an operation S57 of drying a product by controlling the drying furnace is performed.

Steps S40 and S50 are performed through the known painting operation, and a detailed description thereof will be omitted.

Next, a step S60 of unloading a product held on the hanger is performed, and then a step S70 of measuring a thickness of a paint film of the produced product is performed by using the paint film measuring unit 60.

In the embodiment of the present invention, information on the thickness of a paint film measured through step S70 is forwarded to the outside by using any one of RS232, RS485, and Bluetooth.

According to the present invention, it is preferable that step S70 further includes a step of generating an inspection date record or an inspection result report according to the measurement of the thickness of a paint film.

Next, a step of updating a production condition by comparing a thickness of a paint film of the produced product with a production quality condition is performed by using the painting condition calculating unit 50 (S80).

Figure 4:
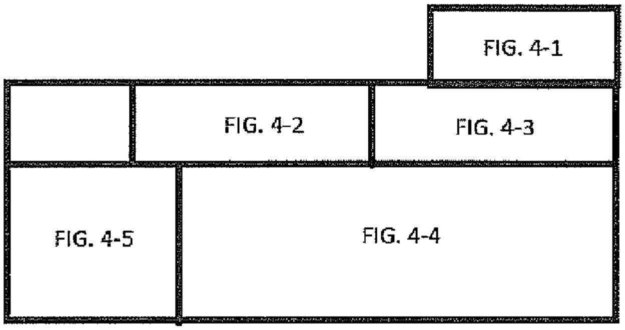
FIG. 4 is a view showing an embodiment of step S80 of the method of automatically controlling a painting process according to the present invention.
Figures 1, 4:
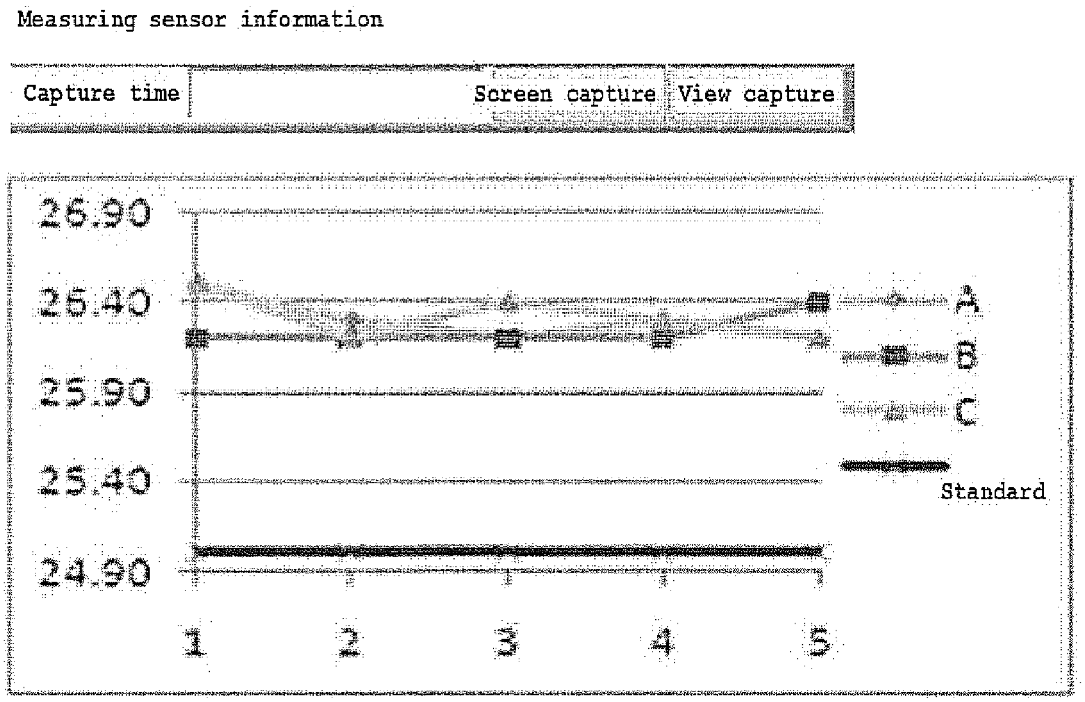
Figures 2, 4:
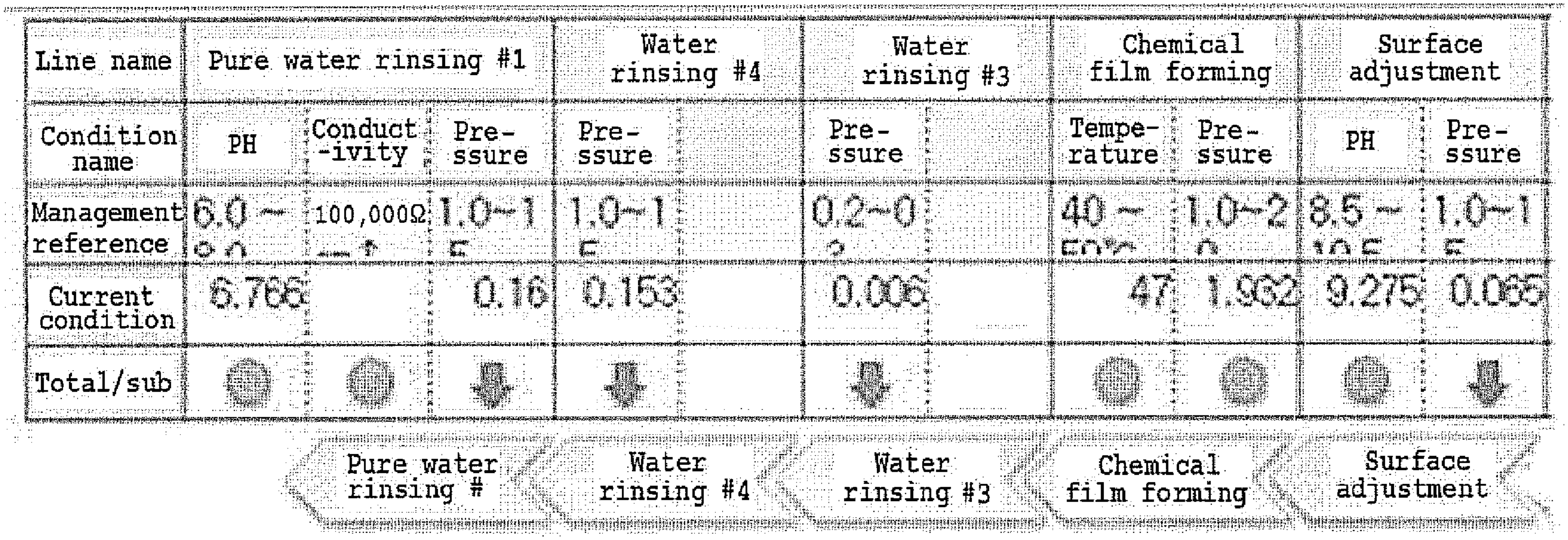
Figure 4:
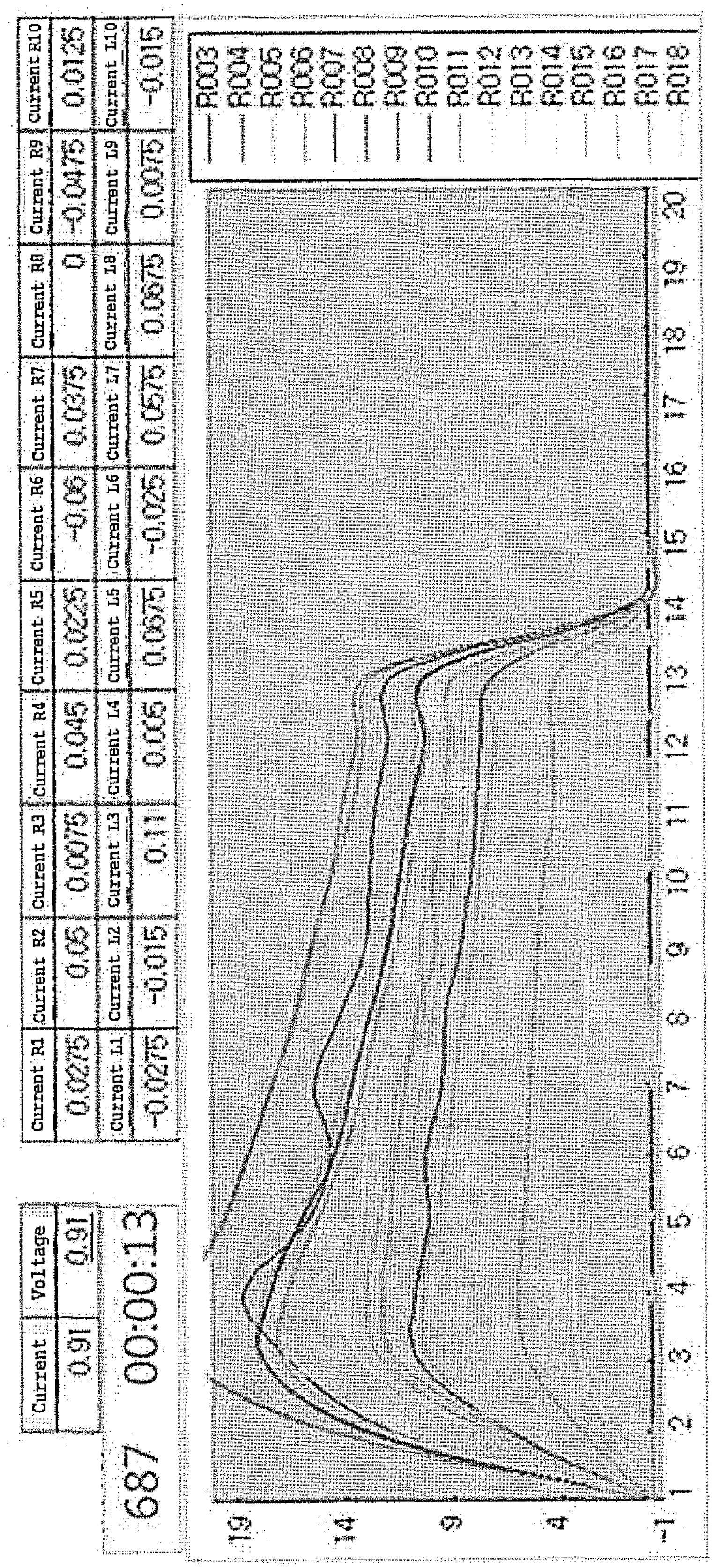

FIG. 4 is a view showing an embodiment of step S80 according to the present invention, in which production qualities can be compared according to the thicknesses of paint films of the actually produced products, and an optimum production condition can be reflected when the same kind of products are produced later by resetting a production condition considering a deviation in the paint films.

Next, a step of storing production condition information calculated by the painting condition calculating unit 50 is performed by using the production information storing unit 70 (890).

As described above, when the method of automatically controlling a painting process according to the present invention is applied, an optimum production condition according to a deviation in paint films can be applied when the same kind of products are additionally produced by evaluating a quality of the actually produced painting product and setting production condition information. Further, an amount of used raw material can be reduced and productivity can be improved. In addition, when a number of inferior products are generated due to LOT, a tracing operation for identifying a cause of error in the production work can be performed.

Although the exemplary embodiment of the present invention has been described until now, the technical spirit of the present invention is not limited to the embodiment but can be realized by various method of automatically controlling a painting process without departing from the scope of the present invention.

The invention claimed is:

1. A method of automatically controlling a painting process, wherein the painting process has a plurality of process steps sequentially performed, the method comprising:

inputting, via a work input unit, information regarding an operator associated with the painting process, information regarding a product to be subjected to the painting process, and information regarding a hanger for transporting the product;

scanning, via a scan unit, a barcode of the product and a barcode of the hanger to generate scanned information;

painting the product using a painting unit based on a production condition;

measuring, via paint film measuring unit, a thickness of a paint film on the painted product;

comparing, via a painting condition calculating unit, a thickness of the paint film with a predetermined production quality condition updating, via a painting condition calculating unit, the production condition based on the comparison to generate an updated production condition; and storing, via a production information storing unit, the updated production condition, wherein the production condition includes at least one of:

information regarding a type of hanger, information regarding an amount of the held products per hanger, an electrostatic voltage, electrostatic current, an electrostatic current flow time, a temperature of an electrostatic container, a paint type, an expediting agent, an amount of degreasing agent, an electrolytic degreasing voltage, or a temperature of a drying furnace.

2. The method of claim 1, further comprising:

comparing, via the painting condition calculating unit, the scanned information with an initial production condition to calculate the production condition.

3. The method of claim 2, further comprising:

controlling, via a painting unit control unit, at least one of an amount of introduced raw material, a supply of pure water, an electrolytic degreasing voltage, an electrostatic flow voltage, an electrostatic current flow time, an electrostatic flow current, a drying temperature, or a temperature of an electrostatic container based on the production condition.

4. The method of claim 3, further comprising:

providing, via the painting control unit, a signal to a metering pump to control at least one of a degreasing agent, a surface adjusting agent, a film former, an expediting agent, or a neutralizer, and providing, via the painting control unit, a signal to temperature control unit to control at least one of a temperature of an electrostatic container or a temperature of a drying furnace.

5. The method of claim 4, further comprising:

providing, via the painting control unit, a signal to a rectifier connected to an electrode rod, an electrode plate, or a conductor of the electrostatic container to control, at least one of an electrolytic degreasing voltage, an electrostatic flow voltage, an electrostatic current flow time, or a flow current.

6. The method of claim 4, further comprising:

controlling, via a timer of the painting control unit, a timing of the signal to the temperature control unit and the rectifier.

7. The method of claim 1, wherein the inputting information regarding the operator comprises:

inputting unique identification information of the operator; and wherein the inputting information regarding the hanger comprises:

inputting information identifying a type of hanger and information regarding a number of products to be held by the hanger.

* * * * *